United States Patent [19]

Itoh et al.

[11] Patent Number: 4,961,669
[45] Date of Patent: Oct. 9, 1990

[54] SPLINE CONNECTION

[75] Inventors: Kazuhito Itoh, Wako; Katsumi Fujimoto, Niiza; Kouji Kuroda, Kawagoe, all of Japan

[73] Assignee: Honda Giken Kogyo Kabushiki Kaisha, Tokyo, Japan

[21] Appl. No.: 304,451

[22] Filed: Feb. 1, 1989

[30] Foreign Application Priority Data

Feb. 5, 1988 [JP]  Japan ................... 63-24024

[51] Int. Cl.$^5$ ............................. F16N 7/36
[52] U.S. Cl. ........................ 403/359; 403/37; 403/39; 74/468; 184/6.12; 192/113 B
[58] Field of Search .......... 403/359, 37–40; 74/467, 468; 192/109 R, 53 F, 113 B; 184/6.12

[56] References Cited

U.S. PATENT DOCUMENTS

| 2,566,080 | 8/1951 | Davids | 403/39 |
| 3,365,913 | 1/1968 | Shields | 184/6.12 X |
| 3,424,022 | 1/1969 | Greenberg et al. | 74/468 X |
| 3,637,049 | 1/1972 | Butterfield et al. | 184/6.12 |
| 4,541,510 | 9/1985 | Itoh et al. | 74/467 X |
| 4,741,220 | 5/1988 | Watanabe et al. | 74/468 X |

OTHER PUBLICATIONS

Japanese Unexamined Utility Model Application Publication No. 58736/1986, Laid Open on 4-19-1986.

Primary Examiner—Andrew V. Kundrat
Assistant Examiner—Franco S. DeLiguori
Attorney, Agent, or Firm—Armstrong, Nikaido, Marmelstein, Kubovcik & Murray

[57] ABSTRACT

A spline connection which comprises a spline boss having inward spline teeth; and a spline shaft engaged slidably with the spline boss and having outward spline teeth is disclosed. A header passage for a lubricant is formed along a core of the spline shaft and oil passages are further formed in the spline shaft in such a manner as to pierce therethrough radially from the header passage. At least one of the outward spline teeth of the spline shaft is provided at the top thereof with a groove crossing transversely the outer spline tooth so as to have the open end of the oil passage disposed in the groove.

8 Claims, 4 Drawing Sheets

SPLINE CONNECTION

BACKGROUND OF THE INVENTION

1. Field of the Invention

This invention generally relates to an improvement to a spline connection which is mainly used for a transmission gear assembled in a transmission, or the like. The spline connection uses the gear shaft of the transmission gear as a spline shaft, and a gear thereof as a spline boss, or a collar interposed between the gear shaft and the gear as a spline collar.

2. Description of the Relevant Art

A spline connection of the type shown in FIGS. 1 and 6 of Japanese Unexamined Utility Model Registration Application Publication No. 58736/1986, for example, is well known. Here, the spline connection is arranged such that the spline shaft thereof which is a gear shaft having a header passage for lubricant formed along the axial core line thereof is provided with oil passage so formed as to extend radially from the header passage and have each of their opening ends disposed in a valley between two neighboring outward spline teeth.

On the other hand, the spline collar thereof is provided with an oil port communicating the inside of the collar with the outside so that the lubricant may be supplied between the collar and the toothed wheel engaging with the outer periphery thereof.

In the spline shaft of the prior art described above, since the oil passages are formed at a diametrally reduced portion of the spline shaft so as to have the open end of each thereof disposed in the valley between the two neighboring outward spline teeth, torsional strength of the spline shaft is reduced. Consequently, the aperture of the oil passage is sacrificed for the necessary torsional strength and the header passage in the spline shaft is diametrally reduced in favor of a larger thickness of the spline shaft.

It might seem to make sense to arrange the oil passages such that the opening end may be located in the top surface of each of the outward teeth of the spline so as to have the oil passages formed in the diametrally larger portions of the spline shaft. In this arrangement, however, the strength of the top portion of the outward spline tooth becomes weak, especially when the width of the top surface of the outward spline tooth is approximately similar in measurement as the aperture of the oil passage. In addition, depending on machining precision of the oil passage, an off-centering of the passage can occur; thereby, causing the edge of the open end formation of a knife edge or burns which is detrimental to the durability of the spline.

As for the spline collar, the oil port of the spline collar must be communicated with the oil passage in order to be able to supply the lubricant to external gears, shift forks, or the like through the collar. Thus, when the spline collar is being fitted to the spline shaft, it is necessary to align, in phase, the spline collar with the spline shaft, but this is an extremely complicated work.

One way to solve the above-discussed problem may be to provide every inward spline tooth of the spline collar with a groove so formed as to cross the tooth transversely and extend alike in the same circumferential direction of the spline collar. The grooves would altogether then form an annular oil passage on the inner peripheral surface of the spline collar. Therefore, even when the spline collar is fitted to the spline shaft unaligned in phase with the latter, a sufficient quantity of lubricant can be supplied to the oil port through this oil passage. However, since it is usual to thinly form the spline collar itself with this arrangement, it is reasonable to assume that the spline collar strength is substantially lowered due to the formation of the grooves

SUMMARY OF THE INVENTION

The present invention has for its object to eliminate the above-discussed disadvantages of the prior art devices.

It is another object of the invention to provide a spline connection with a spline connection shaft so arranged that the drop in its torsional strength is kept to a minimum while assuring the sufficient supply of lubricant.

It is still another object of this invention to provide a spline connection whereby the discontinuous resistance by the grooves at the time of movement in an axial direction is minimized.

It is a further object of this invention to provide a spline connection which makes uniform the supply of lubricant.

It is a further object of this invention to provide a spline connection with a spline connection collar such that the uniform and sufficient supply of lubricant is assured and at the same time the sufficient strength of the spline collar is secured while the complicated operation involved in the phase alignment during the assembly work is avoided.

It is yet a further object of this invention to provide a spline connection in which the drops in strengths of outward and inward spline teeth, as well as the discontinuous resistance by the grooves, at the time of movement in an axial direction are minimized.

In accordance with one embodiment of this invention, a spline connection of the type having a spline boss with inward spline teeth and a spline shaft engaged slidably with the spline boss and having outward spline teeth is disclosed. A header passage for a lubricant is formed along the core of the spline shaft and oil passages are further formed in the spline shaft in such a manner as to pierce therethrough from the header passage. In the spline connection of the present invention, at least one of the outward spline teeth of the spline shaft is provided at a top portion with a groove which crosses transversely the outward spline teeth so as to have the open end of the oil passage disposed in the groove. In this arrangement, it is preferable to form the groove in a U-shaped or arc-shaped in its sectional view. With respect to the spline shaft, the groove may be formed on one outward spline tooth or the grooves may be formed on all the outward spline teeth in the same circumferential direction.

According to another embodiment of this invention, the spline connection has a spline collar with inward spline teeth and a spline shaft engaged slidably with the spline collar and having outward spline teeth. The header passage for a lubricant is formed along the core of the spline shaft. Oil passages are further formed in the spline shaft in such a manner as to pierce therethrough radially from the header passage and an oil port is bored in the spline collar so as to communicate the inside with the outside of the spline collar. The spline has all of the outward spline teeth of the spline shaft provided at their top portions with grooves crossing them transversely in the same circumferential direction and all of the inward spline teeth of the spline collar are provided at their top portions with grooves corresponding to those for the outward spline teeth and crossing them transversely in the same circumferential direction. In this arrangement, it is also preferable to form the grooves in U-shaped or arc-shaped formations.

The spline boss or the spline collar of this invention is fitted and assembled to the spline shaft in such a manner that the inward spline teeth of the spline boss or spline collar mesh with the outward spline teeth of the spline shaft. The lubricant is supplied to and between the inward and outward teeth of the spline from the header passage through the oil passages. In the spline using the spline collar, the lubricant is supplied to the oil port of the spline collar from the oil passages through the grooves so formed correspondingly on the spline collar and the spline shaft as to face one another.

In the spline connection of this invention, the oil passages are formed to extend through the outward spline tooth portions of the spline shaft. The tooth portions are diametrally larger portions of the spline shaft, so that the spline shaft can have higher torsional strength than that of a conventional one. Moreover, the grooves can form an oil reservoir advantageous for the oil supply and any knife edges or burns that are formed at the open edge of each oil passage prevent from contacting the inward spline connection teeth. Furthermore, in the spline of this invention, the side edges of the grooves coming into contact with the inward spline teeth engaging with the outward spline teeth are formed to be curved so that discontinuous resistance resulting from eating into the side edges by the inward spline teeth can be minimized. An annular oil passage can be formed in the circumferential direction in the spline of this invention.

An annular oil passage communicating the oil passages of the spline shaft with the oil port of the spline collar can be formed in the spline and, additionally, the grooves of the inward spline teeth are made shallower by having the grooves on the outward spline teeth so formed as to correspond thereto. Furthermore, in the spline of this invention, the side edges of the grooves can be in a curved form.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENTS

Figure 1:
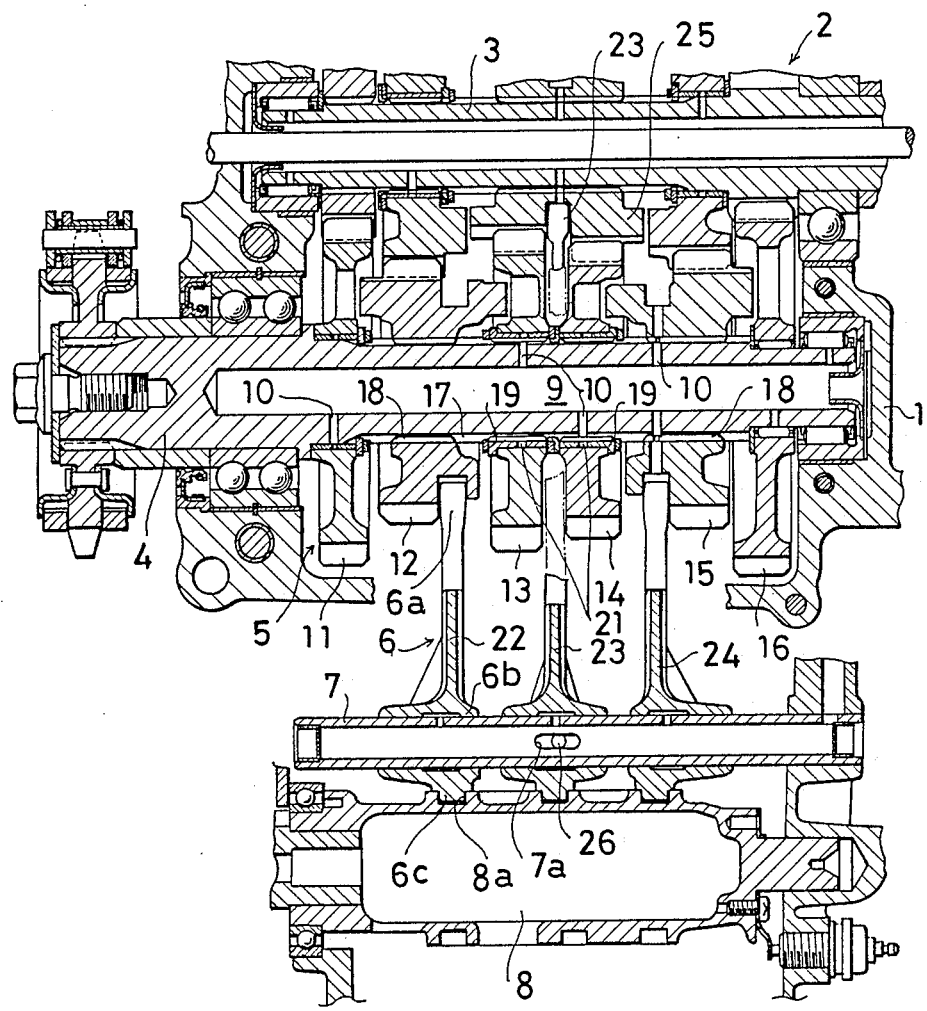
FIG. 1 is a partly cross-sectional view showing the principal portions of a transmission to which the present invention is applied.

Referring to FIG. 1, reference numeral 1 represents a transmission case and reference numeral 2 designates a speed change gear housed in the transmission case. The speed change gear 2 comprises a driving system and a shift system. The driving system comprises a main shaft 3 and a counter-shaft 4 which are so fitted in the transmission case 1 as to be rotatable and provided respectively with predetermined gears 5. The shift system comprises shift forks 6, a shift fork shaft which serves as a sliding shaft of the shift forks 6 and a shift drum 8 for sliding the shift forks 6. The predetermined gears 5 are meshed with one another by the rotation of the shift drum 8 through the shift forks to make a transmission shift.

In the driving system, both the counter-shaft 4 and the main shaft 3 are spline shafts and have a spline in relation to the gears 5 meshing therewith. Accordingly, the following description will deal primarily with the counter-shaft 4.

A header passage 9 for a lubricant is formed along the axial core of the counter-shaft 4 and oil passages 10 are formed radially from the header passage 9 in such a manner as to correspond to the gears 5, respectively, and to supply the lubricant from the header passage 9 to each gear 5 through each oil passage 10.

The gears 5 include (from left to right in FIG. 1) a first gear 11, a second gear 12, a third gear 13, a fourth gear 14, a fifth gear 15 and a sixth gear 16, and are mounted in that order on the counter-shaft 4 which is a spline shaft having outward spline teeth 17 formed on the outer peripheral surface thereof. Among the gears, the second gear 12 and the fifth gear 15 each serve as a spline boss having inward spline teeth 18 formed on the inner peripheral surface thereof and constitutes a spline between them and the counter-shaft 4. The third gear 13 and the fourth gear 14 are supported rotatably on the counter-shaft 4, respectively, through a spline collar 19 having inward spline teeth 18 formed on the inner peripheral surface thereof and there is thus formed a spline connection between the spline collar 19 and the counter-shaft 4. Incidentally, the first gear 11 and the sixth gear 16 rotate idly with respect to the counter-shaft 4.

The outward spline teeth 17 of the counter-shaft 4 and the inward spline teeth 18 of the second and fifth gears 12, 15 or the spline collar 19 are formed of involute ridges extending in an axial direction.

Figure 2:
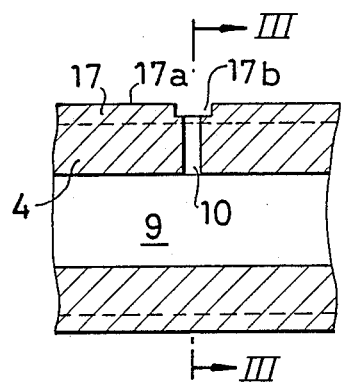
FIGS. 2, 4, 6 and 8 are cross-sectional side views.
Figure 3:
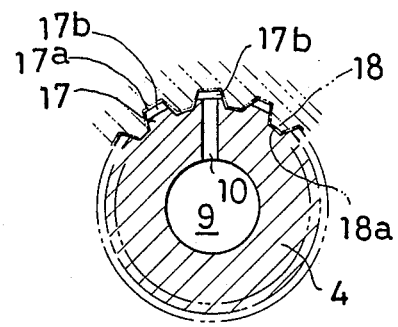
FIGS. 3, 5, 7 and 9 are respective cross-sectional front views taken in the direction of arrows in corresponding FIGS. 2, 4, 6 and 8 of various embodiments of the spline comprising of a spline boss and a spline shaft.
Figure 4:
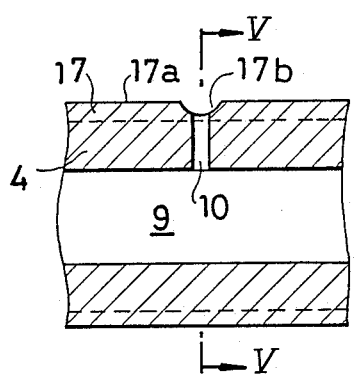
Figure 5:
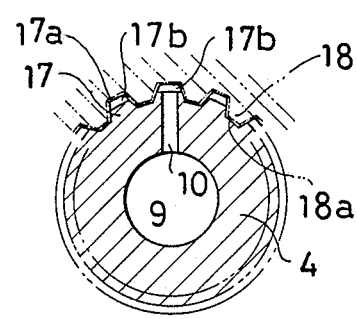
Figure 6:
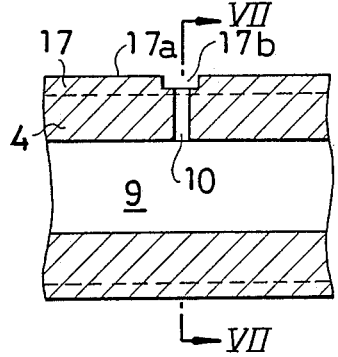
Figure 7:
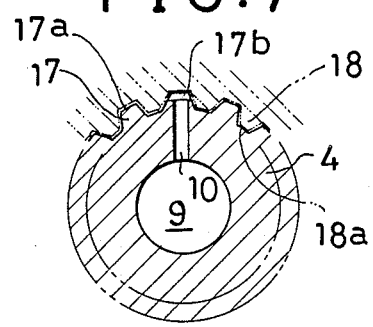
Figure 8:
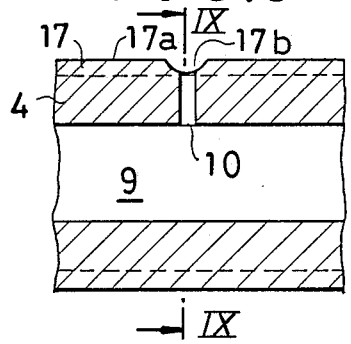
Figure 9:
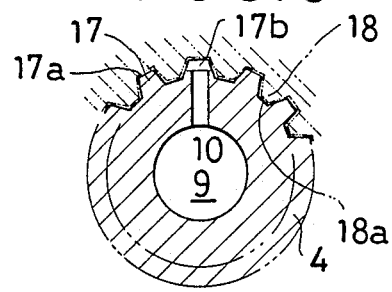
Figure 10:
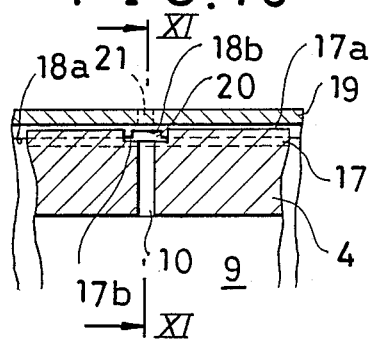
FIGS. 10 and 12 are cross-sectional side views.
Figure 11:
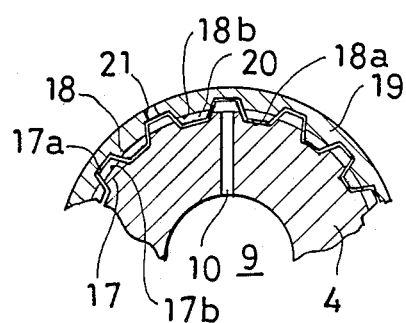
FIGS. 11 and 13 are respective cross-sectional front views taken in the direction of arrows in corresponding FIGS. 10 and 12 of various embodiments of the spline connection comprising of a spline collar and a spline shaft.

As shown in FIG. 2 and 3, in the spline connection formed by the second gear 12 or the fifth gear 15 and the counter shaft 4, there is formed at the top 17a of each outward spline tooth 17 a groove 17b crossing transversely the tooth 17 and the oil passage 10 is so arranged as to open in this groove 17b. The groove 17b is so formed on each of all the outward spline teeth 17 so as to extend in the same circumferential direction. The groove being U-shaped in a sectional view taken along the axis of the counter-shaft and these grooves altogether make up an annular oil passage 20 extending in the circumferential direction. The groove 17b may be formed to have a sectionally arcuate shape as shown in FIGS. 4 and 5.

Furthermore, the groove 17b may be formed only on one of the outward spline teeth 17, as shown in FIGS. 6 to 9. Here, the groove 17b may be formed to be either U-shaped or arc-shaped in the same way as described above.

On the other hand, as shown in FIGS. 10 to 13, in the spline connection formed by the spline collar 19 and the counter-shaft 4, an oil port 21 communicating the inside and the outside of the collar 19 with each other is formed in the spline collar 19. All of the outward spline teeth 17 of the counter-shaft 4 are provided at their top portions 17a with grooves 17b crossing the teeth 17 transversely in the same circumferential direction while all of the inward spline teeth 18 of the spline collar 19 are provided at their top portions 18a with grooves 18b so that the grooves 17b and 18b combine to form an annular oil passage 20 which is communicated with the oil port 21 in the circumferential direction.

Figure 12:
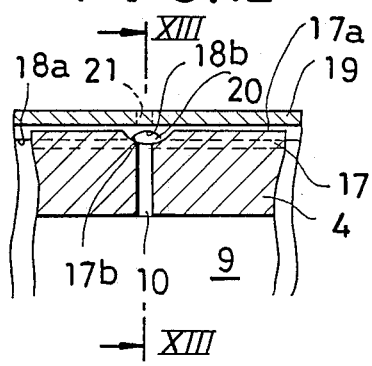
Figure 13:
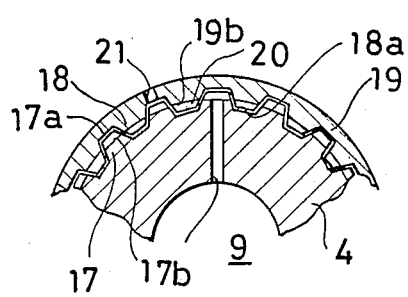

Both the grooves 17b, 18b are either sectionally arc-shaped, as shown in FIGS. 12 and 13, respectively, and combine to form the oil passage 20 having a sectionally rectangular or substantially oval shape. Therefore, the oil passage 10 and the oil port 21 are always kept in communication with each other through this oil passage 20.

The shift fork 6 of the shift system comprises three shift forks including a first shift fork 22, a second shift fork 23 and a third shift fork 24. The first shift fork 22 and the third shift fork 24 engage, respectively, with the second gear 12 and the fifth gear 15 to cause their sliding motions. The second shift fork 23 engages with an intermediate gear 25 provided on the main shaft 3 and causes the intermediate gear 25 to slide.

Figure 14:
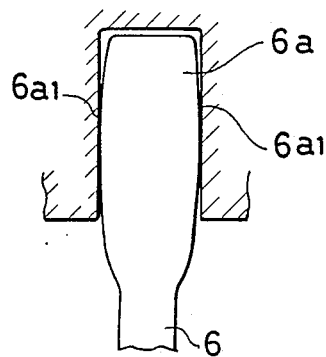
FIG. 14 is a side view of a pawl of a shift fork.

Each shift fork 6 has a pawl 6a engaging with the gear 5, a base 6b slidably and pivotally supported on the shift fork shaft 7 and a base projection 6c engaging with the shift drum 8. As shown in FIG. 14, both side surfaces $6a_1$, $6a_1$ of the pawl 6a are finished in an arcuate form in order to prevent only the corner portions of the pawl 6a from making contact due to a machining error, thereby preventing breakage of the oil film so as to improve wear resistance.

Figure 15:
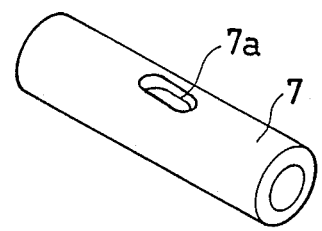
FIG. 15 is a perspective view of a shift fork shaft.

A through-hole 7a is formed on the shift fork shaft 7, and the tip of a bolt 26 provided on the second shift fork 23 is positioned in this through-hole 7a; thereby, preventing the shift fork shaft 7 from slipping out of position. As shown in FIG. 15, the through-hole 7a is formed as an elongated hole so that the shift fork shaft 7 may be allowed to float for improved performance in the shift operation and the through-hole can also be utilized as an oil port.

The shift drum 8 has a cylindrical cam having cam grooves 8a formed around its outer peripheral surface. The base projections 6c of the shift fork 6 described above are engaged with the cam grooves 8a, respectively, and, interlocked with a shift lever (not shown). The cam rotates to slide the predetermined shift fork 6 in the axial direction.

Figure 16:
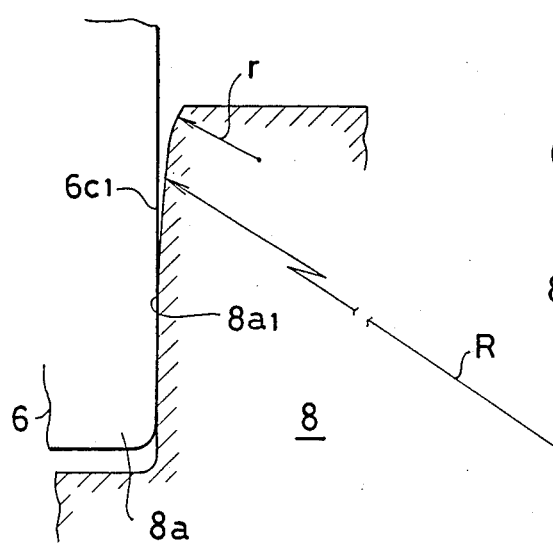
FIGS. 16 and 17 are sectional side views of the engagement portion between a shift fork and a shift drum.
Figure 17:
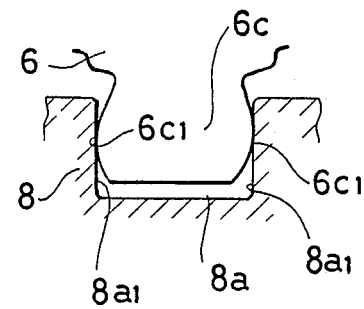

The cam groove 8a is formed so as to have both side walls $8a_1$, $8a_1$ gently curved outward in the opening direction. More specifically, as shown in FIG. 16, the curve from the bottom up to the near-top portion is represented by a large R (radius) while that from the near-top portion up to the top is represented by a small r, so that it is prevented for only the corners of the base projection 6c of the shift fork 6 to come in contact with both sidewalls $8a_1$, $8a_1$ due to machining error. Accordingly, improved wear resistance is achieved. Here both side surfaces $6c_1$, $6c_1$ of the base projection 6c may be formed arc-shaped as shown in FIG. 17.

As described above, there is formed at the top of the outward spline tooth of the spline shaft a groove crossing the tooth transversely and the open end of the oil passage is positioned in the groove. Thus, the drop in strength at the top and the occurrence of knife edge due to the machining error can be prevented and the torsional strength of the spline itself can be improved while securing sufficient supply of the lubricant. In addition, when the groove is sectionally arc-shaped, it is possible to prevent the drop in strength of the outward spline tooth and to minimize the discontinuous resistance caused by the groove. Furthermore, since the grooves are formed so as to be continuous in the circumferential direction, the lubricant can be supplied uniformly and sufficiently. The inward spline teeth of the spline collar and the outward spline teeth of the spline shaft have the grooves so formed thereon so as to correspond to each other and respectively continue in the circumferential direction. Therefore, the sufficient supply of the lubricant and improved strength of the spline collar itself can be secured and at the same time, the complicated alignment work of the spline collar to the spline shaft at the time of the assembly of the spline can be avoided. Furthermore, when each groove is sectionally arc-shaped in the same way as described above, the drop in strength of the inward and outward spline teeth can be prevented and the discontinuous resistance by the groove can be minimized.

While the invention has been particularly shown and described in reference to preferred embodiments thereof, it will be understood by those skilled in the art that changes in form and details may be made therein without departing from the spirit and scope of the invention.

We claim:

1. A spline connection, comprising a spline boss having inward spline teeth with a recess located between said inward spline teeth having inside surfaces; and a spline shaft slidably engaged with said spline boss and having outward spline teeth with outside surfaces, wherein a header passage for a lubricant is formed along a core of said spline shaft and oil passages are further formed in said spline shaft so as to radially pierce therethrough from said header passage, wherein at least one of said outward spline teeth of said spline shaft is provided at a top portion thereof with a groove crossing transversely said top portion of said outward spline tooth so as to have an open end of said oil passage disposed in said groove to thereby assure the uniform supply of lubricant to said spline connection, said recess inside surfaces located radially outward of said groove along an axis through the center of said spline shaft.

2. The spline connection according to claim 1, wherein said groove on said outward spline teeth of said spline shaft has a generally sectional U-shaped recess.

3. The spline connection according to claim 1, wherein said groove on said outward spline teeth of said spline shaft has a generally sectional arcuate shape.

4. The spline connection according to claim 1, 2 or 3, wherein said groove is formed on one outward spline tooth.

5. The spline connection according to any of claim 1, 2 or 3, wherein said groove is formed on all of said outward spline teeth in the same circumferential direction.

6. A spline connection, comprising a spline collar having inward spline teeth with recesses between said inward spline teeth having inside surfaces; and a spline shaft engaged slidably with said spline collar and having outward spline teeth with outside surfaces, wherein a header passage for a lubricant is formed along a core of said spline shaft, wherein oil passages are further formed in said spline shaft so as to radially pierce therethrough from said header passage, and an oil port is bored in said spline collar so as to communicate an inside portion with an outside portion of said spline collar, wherein all of said outward spline teeth of said spline shaft are provided at top portions thereof with grooves crossing said top portions of said outward spline teeth transversely in the same circumferential direction, and all of said inward spline teeth of said spline collar are provided at top portions thereof with grooves crossing said top portions of said inward spline teeth transversely in the same circumferential direction to thereby assure the uniform supply of lubricant to said spline connection, said recess inward surfaces located radially outward of said groove on said top portions of said outward spline teeth along axes through the center of said spline shaft.

7. The spline connection according to claim 6, wherein each of said grooves of said inward and outward spline teeth has a generally sectional U-shaped recess.

8. The spline connection according to claim 6, wherein each of said grooves of said inward and outward spline teeth has a generally sectional arcuate shape.

* * * * *